United States Patent [19]

Zawadzki, Jr. et al.

[11] Patent Number: 4,525,100
[45] Date of Patent: Jun. 25, 1985

[54] TRANSPORTATION AND DISPOSAL OF WASTE MATERIALS

[75] Inventors: Stanley C. Zawadzki, Jr., Ransomville; Robert A. Stadelmaier, Orchard Park, both of N.Y.; John J. Perrone, Westchester, Ohio

[73] Assignee: Cecos International, Inc., Buffalo, N.Y.

[21] Appl. No.: 469,041

[22] Filed: Feb. 23, 1983

[51] Int. Cl.³ ............................................. E02D 3/08
[52] U.S. Cl. ...................................... 405/129; 47/74; 220/DIG. 30; 405/128
[58] Field of Search ............................. 405/128, 129; 220/DIG. 30; 47/74

[56] References Cited

U.S. PATENT DOCUMENTS

| | | | |
|---|---|---|---|
| 1,923,677 | 8/1933 | Lovett | 47/74 |
| 2,567,706 | 9/1951 | Hannum et al. | 47/74 |
| 3,080,680 | 3/1963 | Reynolds et al. | 47/74 |
| 3,583,164 | 6/1971 | Sherrill | 405/129 |
| 3,736,889 | 6/1973 | Reid | 47/74 X |
| 3,762,454 | 10/1973 | Wilkins | 220/DIG. 30 |
| 3,772,139 | 11/1973 | George | 220/DIG. 30 |
| 3,992,986 | 11/1976 | Sutton | 405/129 X |

Primary Examiner—Dennis L. Taylor
Attorney, Agent, or Firm—Bean, Kauffman & Bean

[57] ABSTRACT

There is disclosed a system for transportation of materials such as industrial wastes from a source thereof to a temporary storage and/or a permanent disposal site or the like, utilizing batch containers of maximum space-saving configurations and taking advantage of the fact that such waste materials invariably densify volume-wise during handling such as during transit from the source to the storage facility. The containers of the invention are of temporarily shape-competent fiberboard type construction or the like; but are in any case fabricated of material which is moisture-vulnerable, whereby subsequent to transport and disposal thereof they soften down and allow the contents of contiguous containers to spread out and settle down and thereby close any previously existing empty spaces therebetween. Thus, the volume of the storage or depository site may be more efficiently employed; and in the case of a landfill operation it may be "completed" after a relatively short time lapse without prospect of subsequent surface subsidence problems because the burial/storage site includes no empty spaces.

8 Claims, 9 Drawing Figures

THE INVENTION

PRIOR ART

TRANSPORTATION AND DISPOSAL OF WASTE MATERIALS

BACKGROUND AND OBJECT OF THE INVENTION

This invention relates to the packaging, transportation and disposal of industrial waste materials such as may be either in the form of free flowing solids, liquids or combinations thereof. Various manufacturing/chemical operations require by-product waste disposal facilities; and it is current practice to load such waste materials at the source in steel drums, and to transport the drums to a disposal site such as for example a "landfill" operation wherein the drums are placed and covered over the acceptable fill material. Such landfill facilities are in scarce supply, and the operating areas thereof represent substantial cost investments. Therefore, it is of utmost importance that the available space be utilized if possible to its entirety.

Also, the transportation of such waste containers to the disposal site comprises a relatively costly portion of the overall operation; and cylindrical drums for transporting such materials by means of the typically available highway trucks, trailers, vans and the like do not take full advantage of such transport facilities. The bed of a typical transport vehicle carrying such waste materials in cylindrical drums is quite inefficiently occupied, and therefore the weight of the profitable load is typically considerably less than the axle weight capacity of the transport vehicle.

The present invention has for its object to provide an improved system and means for substantially reducing the costs of transporting, storing and disposing of such wastes.

BRIEF SUMMARY OF THE INVENTION

Such wastes as are referred to herein (whether they comprise solids, liquids or combinations thereof) slump down and densify during transit from source to the storage facility due to "shake-down" liberation of entrained and/or absorbed air; and the mass volumes thereof decrease in some cases of record up to as much as 15 percent of the originally loaded volume. Instead of permanently rigid containers such as steel drums or the like, the invention employs a temporarily shape-competent (but excess moisture-vulnerable) type container of such geometric form as to be efficiently receivable in compactly nesting manner within the confines of a transport carrier bed or body for more profitable usage thereof. Flexible, fluid-impervious liners are provided for each container.

Upon arrival at the storage site, the containers are again emplaced in maximum space-saving formation and then the walls of the containers are permitted to be saturated by moisture furnished by the environment. In a relatively short time, the material of the container walls softens and this allows contiguous containers to spread against each other and to close any previously existing empty spaces therebetween. Hence, there is provided a more efficiently filled depository. This may then be covered with appropriate fill material or otherwise "completed" after a relatively short time lapse featuring complete usage of the available volume.

BRIEF DESCRIPTION OF THE DRAWINGS

FIG. 3 is a top plan view showing how pluralities of such units may be relatively compactly loaded upon the bed of a transport van or trailer or the like, such as by means of a fork-lift or the like;

DETAILED SPECIFICATION

Figure 1:
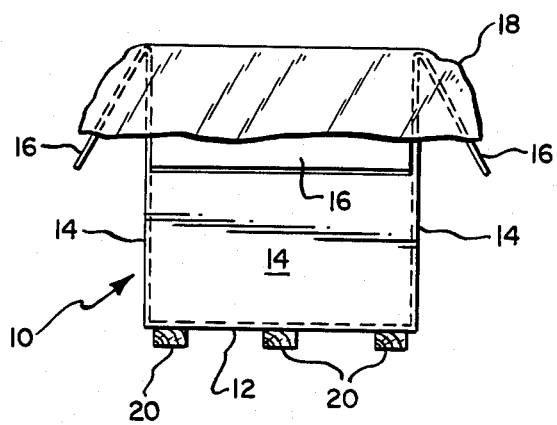
FIG. 1 is an end elevational view of a waste transport/disposal container unit of the present invention; the rigid contour-forming portion thereof and an inner liner therefor of separate bag-like form being shown in open position for reception of a charge of waste material to be handled.
Figure 2:
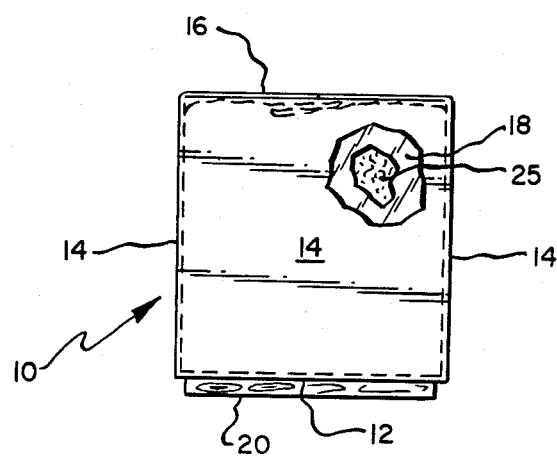
FIG. 2 is a side elevational view thereof after the unit has been fully loaded and closed, and is ready for transport to a storage or disposal site.

As shown in the drawing at FIGS. 1 and 2 herewith, the system of waste handling in a preferred mode of the present invention employs a polygonal and preferably cubically shaped type housing 10 which comprises a four flap type bottom wall/portion 12 thereby providing four side wall portions 14 including four top cover flap portions 16. A flexible fluid-impervious liner bag 18 is also provided. However, if preferred, the lining may be provided by spraying a water-impervious material on the inside surfaces of the housing. The bottom, side and cover portions of the housing 10 are fabricated of normally rigid (but excess moisture-vulnerable) panels of fiberboard or the like which are integrated into box-like form by any suitable adhesive or mechanical interconnecting process. Upon filling, the cover portions of the containers may be fastened down such as by means of tapes or the like. Parallel base support rails 20 formed of typical two by four wood stock or the like are fastened to the underside of the bottom wall 12 of the container to enable lift trucks to engage, transport and deposit the containers onto the transport truck or the like, and therefrom to a processing or storage facility.

Figure 3:
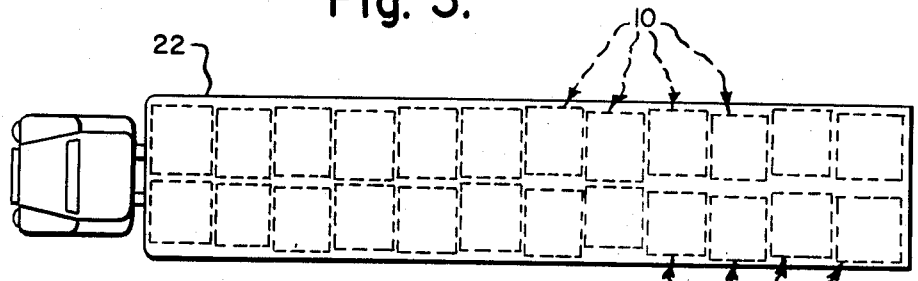
Figure 4:
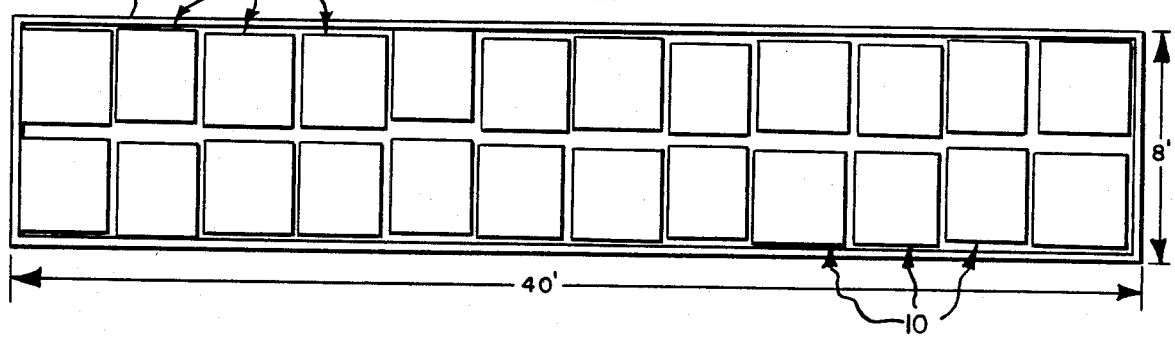
FIG. 4 is an enlarged scale plan view of a typical loading arrangement such as shown in FIG. 3.
Figure 5:
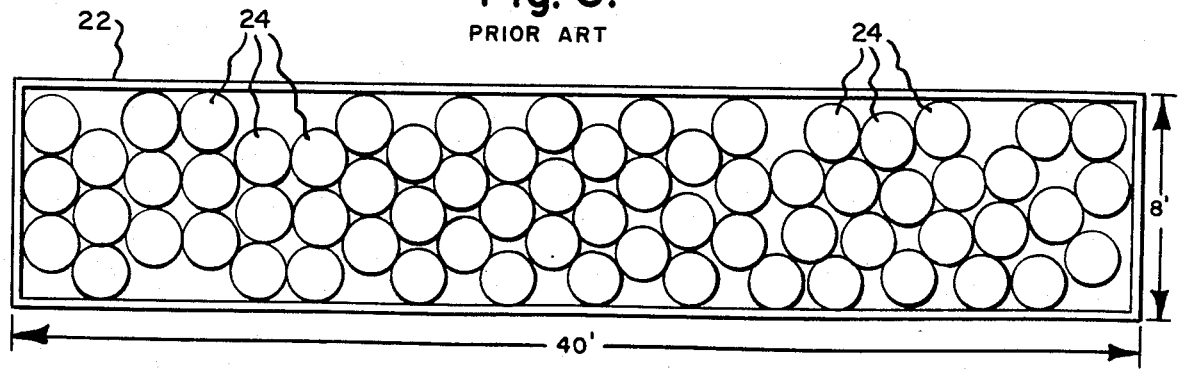
FIG. 5 corresponds to FIG. 4 but shows how a similar loading of cylindrical drums carrying such wastes involves substantially more lost space in the carrying van.

FIGS. 3 and 4 illustrate how a currently typical highway transport vehicle bed 22 may be efficiently loaded such as by a lift truck or the like, without much appreciable lost space therewithin. In the example shown, the vehicle bed is of DOT authorized outside width of eight feet, and of a length of forty feet. The transport containers 10 of the invention by way of example measure 37½ inches in all three dimensions and accommodate when loading one cubic yard of material which may be assumed to weigh 1 ton. By contrast, FIG. 5 illustrates how a substantially lesser number of "DOT 17E" style steel drums of 24¼ inches diameter may be loaded on the same trailer; each such drum accommodating only 7.5 cubic feet of waste material (assuming again the material weighs 2,000 pounds per cubic yard). As is evident, the transport loading of FIG. 5 occupies approximately 25 percent less of the available space, compared to the transport loading of FIG. 4.

Figure 6:
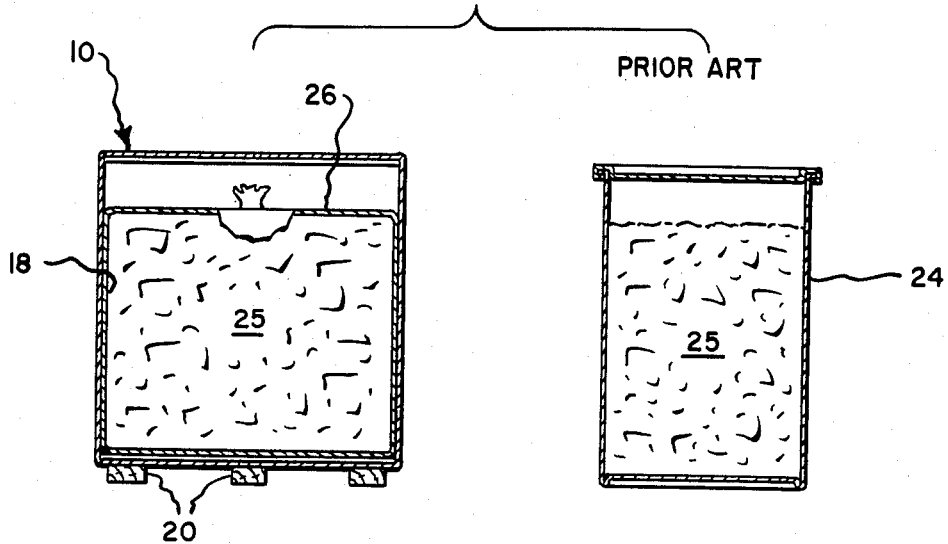
FIG. 6 is a composite of fragmentary vertical sectional views of a unit of the invention and of a cylindrical drum typifying the prior art; showing by means of broken lines how the contents thereof settle down during transport operations.
Figure 7:
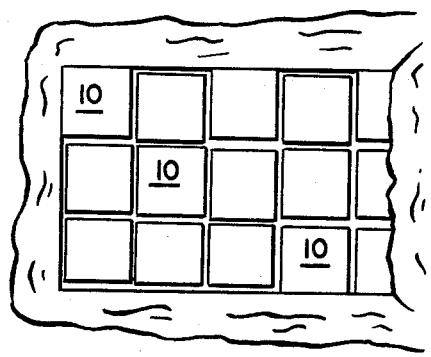
FIG. 7 is a plan view somewhat corresponding to FIG. 4, but illustrates how the units containing settled waste materials may be compactly disposed such as in a landfill site or the like subsequent to the transport operation.
Figure 8:
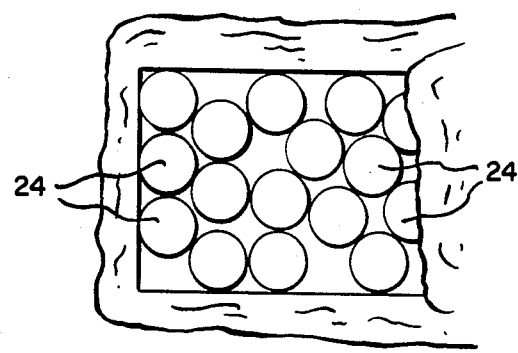
FIG. 8 corresponds to FIG. 7, but illustrates how typical prior art cylindrical drum type transport/disposal units carrying an overall lesser quantity of waste materials occupy a substantially larger percentage of available disposal site area, compared to the system of the present invention.

FIG. 6 illustrates how the loaded waste material 25 settles down within the containers 10 of the invention as well as within cylindrical drums 24 of the prior art, such as to levels indicated by broken lines 26 during their handling incidental to transport from the source to the depository. Furthermore, FIG. 7 illustrates how the waste containers of the invention may be set into the storage site in most efficient space-saving manner whereas FIG. 8 shows by comparison how inefficiently from the space-saving standpoint the containers of the prior art may be disposed within the same area. It is to be understood that the terms "storage site" and "depository" are intended to refer to any location such as a stockpile serving a further processing operation; a landfill operation; or any other type storage or depository facility.

Figure 9:
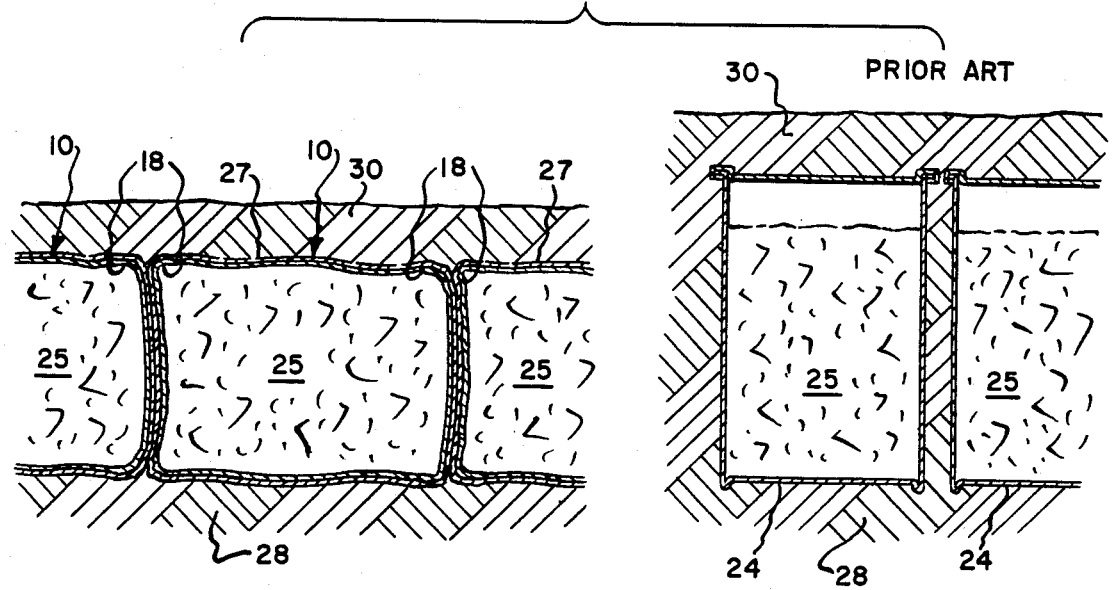
FIG. 9 is a composite of fragmentary vertical sectional views showing how the so-disposed units of the invention compactly nest together within the disposal site and then may be pressed down and covered into a unified mass without any loss of space, compared to similarly accommodated metal drums which were originally fully filled with waste material which has settled during transport.

FIG. 9 provides a composite of vertical sectional views illustrating at the left-hand side thereof how containers of the invention which are for example set on the bottom 28 of a prepared landfill site or the like are then crushed down such as by a roller/bulldozer/caterpillar tractor, or the like. Incidental to this, the containers are subjected to a softening process such as from exposure to ambient moisture of rain water. The side walls of the containers thereupon soften and deform permitting the waste material contents to spread and further settle down such as to levels as indicated at 27 (FIG. 9) which may decrease the height of the deposit by as much as another 10 percent. This is because when moving the containers into the landfill, they cannot be perfectly placed in compacted relation against one another. Incidental to the crushing down process, the overlapped container flaps 16 covering the tops of the containers 10 distribute the crushing forces over the tops of the containers, thereby assisting in attainment of thorough compaction and leveling of the deposit while preventing spurting of waste materials upwards and out of the containers.

After the containers and their contents are crushed down, a cover of topsoil or other materials such as may be compatible with the environment as shown at 30 may then be spread over the deposit to complete the operation without prospect of subsequent irregular surface subsidence problems compared to systems of the prior art. For example, as illustrated at the right-hand side of FIG. 9, when metal drums are employed as hereinabove explained, such drums when covered and pressed down upon resist compression and maintain their dimensional integrities. However, such containers in time corrode and disintegrate, thereby permitting the top cover of the landfill to irregularly subside while filling the "buried" voids within the tops of the drums. Optionally, in accordance with the prior art, such drums are sometimes opened upon arrival at the disposal site in order to permit the overfill cover to occupy the voids within and around the drums. Such practices obviously involve undesirable labor cost and safety problems.

Accordingly, it will be appreciated that by virtue of the invention a waste material disposal system of substantially reduced overall cost is provided. The containers per se are of substantially reduced cost compared to prior art containers used for such purposes and provided for improved handling efficiency and substantially lower transportation costs. Furthermore, a landfill operation receiving containers in accordance with the present invention requires substantially less volume, and may be covered within a shorter period of time without prospect of surface subsidence, such as would destroy the preferred top surface contour of the landfill cover, compared to prior art systems.

Additionally, because of the potential for subsidence in the case of prior art systems, extra thicknesses of cover material are typically required for the final landfill capping. By virtue of the present invention, such extra cover material is not necessary, resulting in a lower cost for closure of the landfill while maintaining the same level of environmental protection. Whereas the invention has been illustrated and described heretofore as being related to single layers of stored or deposited waste containers of the present invention, it is to be understood that when containers of the invention are stacked in multiple layers, the system of the invention provides additional cost-saving advantage. In the case of multiple layer disposal arrangements, it is optional as to whether cover material may be emplaced between the layers.

We claim:
1. A method for receiving waste in the form of free flowing solids, liquids or combinations thereof from a waste source and transporting said waste to a storage station and effecting disposal thereof, said method comprising:
   batch-loading said waste in a succession of transport containers, each of said containers comprising a box-like polygonal housing formed of an excess-moisture structurally vulnerable material normally having sufficient shape-wise rigidity to withstand deformation from its plan view configuration under the weight of waste placed therewithin and having the inner surfaces thereof covered by a flexible fluid-impervious material;
   placing a plurality of such loaded containers in compactly nested relation upon a transport facility;
   transporting said loaded containers to a designated storage station;
   transferring said loaded containers to said storage station while placing them in at least one layer in which said loaded containers are in closely nested together relation; and
   exposing said loaded containers in said layer to excess-moisture conditions to effect softening of said structurally vulnerable material and permit said housings and waste contents thereof to spread out and settle down, whereby to eliminate open spaces present between said loaded containers of said layer and to decrease the height of said layer.

2. A method as set forth in claim 1 wherein said fluid-impervious material covering said inner surfaces of said housing is of separate bag-like form.

3. A method as set forth in claim 1 wherein is provided the additional steps of compressing down said loaded containers in said layer exposed to excess-moisture conditions and subsequently covering same with an environmentally compatible material.

4. A method as set forth in claim 2 wherein is provided the additional steps of compressing down said loaded containers in said layer exposed to excess-moisture conditions and subsequently covering same with an environmentally compatible material.

5. A container, multiples of which are adapted for use in the handling and transporting of batches of waste materials in the form of free-flowing solids, liquids or combinations thereof and such as are propense to volume densification whenever subjected to vibration forces; and to the disposing thereof as set forth in any one of claims 1, 2, 3 or 4;

said container having a cubically shaped housing, a separately formed liner bag in said housing for retaining said waste materials deposited within said container and a base support to permit a lift truck to engage, transport and deposit said container, said housing being capable of temporarily maintaining its configuration for maximum space-saving dispositions thereof when emplaced in relation to similar companion containers during handling and transport thereof from the material source, and upon disposition thereof within a storage site, while being vulnerable to deformation from said configuration upon exposure to excess moisture, whereby said container is adapted to substantially maintain its configuration during transport from said source to said storage station, but permit the exposure thereof to excess moisture after arrival at said storage station to soften down said housing and permit the housings and contents of contiguously disposed containers to settle down and laterally expand and close off any prior open spaces therebetween for maximum usage of the volume of said storage station.

6. A container as set forth in claim 5 wherein base support means is in the form of elongate members of structurally rigid form, subtended from the bottom surface of said container in substantially parallel spaced apart relation.

7. A container according to claim 5, wherein said housing has four folded flap type bottom and top walls and four side walls; and said base support is fixed to said bottom wall.

8. A method as set forth in claim 1, wherein said housing is cubic in form and has a four folded flap type bottom wall portion, four side wall portions and a four folded flap type top wall portion; and said fluid-impervious material is a separately formed flexible bag.

* * * * *